No. 819,288. PATENTED MAY 1, 1906.
A. KOOTZ & E. E. SCHIRMER.
NUT LOCK.
APPLICATION FILED SEPT. 27, 1905.
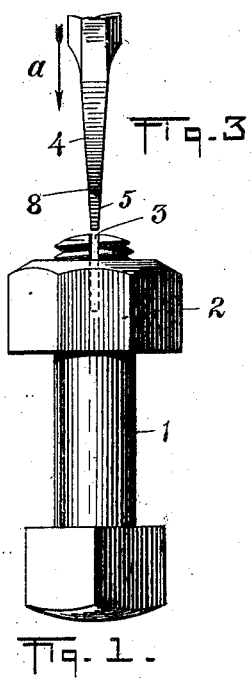
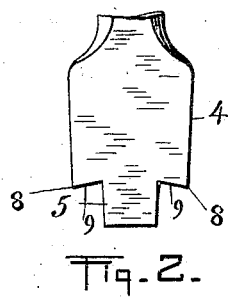
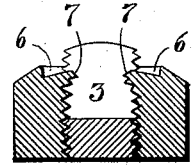
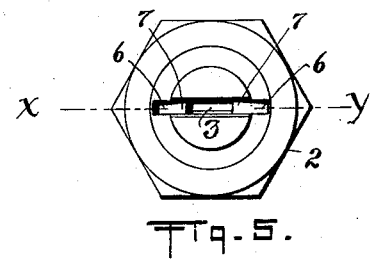

UNITED STATES PATENT OFFICE.

ALBERT KOOTZ AND EDWARD EVERETT SCHIRMER, OF PARKERSBURG, WEST VIRGINIA, ASSIGNORS OF ONE-THIRD TO HENRY C. JACKSON, OF PARKERSBURG, WEST VIRGINIA.

NUT-LOCK.

No. 819,238.   Specification of Letters Patent.   Patented May 1, 1906.

Application filed September 27, 1905. Serial No. 280,269.

*To all whom it may concern:*

Be it known that we, ALBERT KOOTZ and EDWARD EVERETT SCHIRMER, citizens of the United States, and residents of Parkersburg, in the county of Wood and State of West Virginia, have invented certain new and useful Improvements in Nut-Locks, of which the following is a specification.

Our invention relates to improvements in lock-nuts, particularly for bolts or screws.

The objects of our invention are to provide a simple, cheap, and effective nut-lock, and we attain these objects by the ways, means, and devices described and illustrated herein.

In the accompanying drawings like figures of reference refer to like parts throughout the respective views.

Referring to the figures, Figure 1 is an elevation of a bolt and nut, showing a slot in one end of the former, partly in dotted lines. Fig. 2 is a side elevation of a tool used in completing the lock. Fig. 3 is an end or edge elevation of the same and in connection with Fig. 1 shows it in position to complete the lock. Fig. 4 is a vertical section of the nut and bolt end in the plane $x\ y$, Fig. 5, after the lock is completed. Fig. 5 is a plan of the nut and bolt end after the lock is completed.

In Fig. 1, 1 is the bolt; 2, the nut to be locked thereon; 3, a slot in the end of the bolt extending down, as shown by dotted lines, for a considerable distance into that part of the bolt covered by the nut.

In Figs. 2 and 3, 4 is the body of the chisel, punch, or wedge; 5, the wedge proper, adapted to fit into the top of the slot 3. 8 represents teeth, spurs, or wedge-points formed by cutting away the metal of the tool at an angle, as shown at 9.

In Figs. 4 and 5, 6 6 are depressions or indents caused by the points 8 in the top of the nut. 7 represents the metal of the nut depressed or displaced by the points 8 and driven into the slot 3.

The method of operation is as follows: The bolt is provided with a slot of such depth as to extend some distance into the part covered by the nut when finally adjusted and of such width that the edge 5 of the tool 4 can be inserted in it at the top. After the bolt is in place and the nut is placed thereon the tool 4 is placed with the wedge 5 in the slot and given a sharp blow. This wedge part 5 is narrower than the diameter of the bolt, so that it may be readily withdrawn after the operation is complete. The blow separates the sides of the bolt, driving them tightly into or against the nut 2. If the nut is screwed on, as shown in the drawings, the threads are thus firmly wedged. If the blow is repeated or if the intensity of the original blow was sufficient, the tool will proceed in the direction of the arrow $a$, Fig. 3, until the points 8 bear upon and, indeed, indent the upper surface of the nut, as at 6, Figs. 4 and 5. In order to force the metal of the nut against the bolt and also to upset or squeeze it into the slot itself, the edge 9 is cut back at an angle, (see Fig. 2,) the effect of which of course is to force the metal in from the edges. Thus the bolt end is in the first place expanded at right angles to the slot against the nut by the wedge 5 and afterward a portion of the metal of the nut is compressed or forced into the slot itself in a direction at right angles to the first, as at 7, by the points 8, so a double lock is formed, securely binding the bolt and nut.

Heretofore in the endeavor to find a satisfactory lock for bolts and nuts several parts have usually been combined in such a way as to mutually coöperate to secure the nut; but the multiplication of parts, with the accompanying liability to loss, misfit, expense, complication, and liability to misadjustment and movement are objections absent from our improvement, in which the component parts of the complete lock are the nut and bolt. Moreover, in our improvement no difficult process of manufacture is necessary. The slot may be formed in any well-known and simple manner, and the tool itself may be easily made from a simple cold-chisel.

What we claim, and desire to secure by Letters Patent, is—

1. The method of locking a nut on a bolt which consists in first spreading apart the end of the bolt; second, compressing the material of the nut into the spread end of the bolt simultaneously on both sides.

2. The method of locking a nut on a bolt which consists in first spreading apart the end of the bolt so as to force the sides of the bolt against the interior of the nut; second, forcing the material of the nut into the spread end of the bolt simultaneously on both sides.

3. The method of locking a nut on a bolt which consists in, first, spreading apart the slotted end of the bolt so as to force the sides of the bolt against the interior of the nut; second, compressing the end of the nut at points opposite the slot of the bolt so as to force the material of the nut into the slot simultaneously on both sides.

4. The method of locking a nut on a bolt which consists in first forcing a wedge into the end of the bolt so as to spread open the same and force its walls against the interior of the nut; second, forcing wedges into the top of the nut in line with the slot so as to force the material of the nut into the spread end of the slot simultaneously on both sides.

5. The method of locking a nut on a bolt which consists in, first, forcing a wedge into the end of the bolt longitudinally in the plane of its axis, so as to spread open the same and force its walls against the interior of the nut; second, forcing wedges in the same way into the top of the nut at each side of the slot so as to simultaneously force the material of the nut on each side into the slot.

6. The method of locking a nut on a bolt which consists in applying a force so as to successively spread open the end of the bolt and simultaneously compress both sides of the nut into the slot by one motion.

7. The method of locking a nut on a bolt which consists in, first, spreading the end of the bolt; second, forcing portions of the nut on opposite sides of the bolt simultaneously toward each other and into the slot.

Signed at Parkersburg, in the county of Wood and State of West Virginia, this 31st day of August, A. D. 1905.

ALBERT KOOTZ.
EDWARD EVERETT SCHIRMER.

Witnesses:
  H. WOODYARD,
  A. D. IRELAND.